(12) United States Patent
Duan

(10) Patent No.: US 8,022,665 B2
(45) Date of Patent: Sep. 20, 2011

(54) BIDIRECTIONAL POWER CONVERTING DEVICE

(75) Inventor: Rou-Yong Duan, Guosing Township, Nantou County (TW)

(73) Assignee: Hungkuang University, Shalu, Taichung County (TW)

( * ) Notice: Subject to any disclaimer, the term of this patent is extended or adjusted under 35 U.S.C. 154(b) by 349 days.

(21) Appl. No.: 12/433,049

(22) Filed: Apr. 30, 2009

(65) Prior Publication Data
US 2010/0277117 A1 Nov. 4, 2010

(51) Int. Cl.
*H02J 7/00* (2006.01)
(52) U.S. Cl. .................... 320/108; 320/124; 320/130
(58) Field of Classification Search .................. None
See application file for complete search history.

(56) References Cited

U.S. PATENT DOCUMENTS 7,378,818 B2 * 5/2008 Fowler et al. ............... 320/119
7,382,113 B2 * 6/2008 Wai et al. .................... 323/222

* cited by examiner

*Primary Examiner* — Minh N Tang
(74) *Attorney, Agent, or Firm* — Sunstein Kann Murphy & Timbers LLP

(57) ABSTRACT

A bidirectional power converting device coupled between first and second power storage units includes: a coupling circuit including a first winding coupled to the first power storage unit, and a second winding coupled in series to the first winding; first and second switches coupled to the first winding; a capacitor coupled between the first and second switches; a third switch coupled between the second winding and the capacitor; and a fourth switch between the second winding and the second power storage unit. The first, second, third and fourth switches are operable so that an input voltage supplied by one of the first and second power storage units is converted into an output voltage that is to be supplied to the other one of the first and second power storage units.

9 Claims, 18 Drawing Sheets

BIDIRECTIONAL POWER CONVERTING DEVICE

BACKGROUND OF THE INVENTION

1. Field of the Invention

The invention relates to a power converting device, more particularly to a bidirectional DC-to-DC power converting device.

2. Description of the Related Art

FIG. 1 illustrates a conventional bidirectional power converting device disclosed in U.S. Pat. No. 7,382,113. The conventional bidirectional power converting device is coupled between a rechargeable battery 21 and a capacitor 22, and is operable so that an input voltage is supplied by one of the rechargeable battery 21 and the capacitor 22 is converted into an output voltage that is to be supplied to the other one of the rechargeable battery 21 and the capacitor 22. When the input voltage, i.e., $V_L$, is supplied by the rechargeable battery 21 for conversion into the output voltage, i.e., $V_H$, that is to be supplied to the capacitor 22 for charging the capacitor 22, the rechargeable battery 21 serves as a power source and the capacitor 22 serves as a load. On the other hand, when the input voltage, i.e., $V_H$, is supplied by the capacitor 22 for conversion into the output voltage, i.e., $V_L$, that is to be supplied to the rechargeable battery 21 for charging the rechargeable battery 21, the capacitor 22 serves as a power source and the rechargeable battery 21 serves as a load.

The conventional bidirectional power converting device includes a coupling circuit 1, a first switch 101, a second switch 102, a third switch 103, a first diode 111, a second diode 112, a third diode 113, a first capacitor 121, a second capacitor 122, and an inductor 13. The coupling circuit 1 includes first and second windings 11, 12 each having a polarity end and a non-polarity end. The polarity end of the first winding 11 is coupled to the rechargeable battery 21. The non-polarity end of the first winding 11 is coupled to the polarity end of the second winding 12. The first switch 101 is coupled between the non-polarity end of the first winding 11 and ground, and is operable between an ON-state and an OFF-state. The first diode 111 has an anode coupled to the non-polarity end of the first winding 11, and a cathode. The first capacitor 121 is coupled between the cathode of the first diode 111 and ground. The third diode 113 has an anode coupled to the cathode of the first diode 111, and a cathode. The second capacitor 122 is coupled between the non-polarity end of the second winding 12 and the cathode of the third diode 113. The second diode 112 has a grounded anode and a cathode. The inductor 13 is coupled to the polarity end of the first winding 11 and the cathode of the second diode 112. The second switch 102 is coupled between the cathodes of the second and third diodes 112, 113. The third switch 103 is coupled between the cathode of the third diode 113 and the capacitor 22. Since the operation of the conventional bidirectional power converting device is described in detail in the aforesaid patent, further discussion of the same is omitted herein for the sake of brevity.

It is noted that the inductor 13 and the diodes 111, 112, 113 are utilized to achieve bidirectional power conversion. However, since the diodes 111, 112, 113 have conduction losses larger than those of the switches 101, 102, 103, and since soft switching characteristics of the switches 101, 102, 103 are unapparent, the conventional bidirectional power converting device has inferior power transformation efficiency. Moreover, due to the presence of the inductor 13, the conventional bidirectional power converting device has a relatively large volume and incurs relatively high costs.

SUMMARY OF THE INVENTION

Therefore, an object of the present invention is to provide a bidirectional power converting device that can overcome the aforesaid drawbacks of the prior art.

According to the present invention, there is provided a bidirectional power converting device adapted to be coupled between first and second power storage units. The bidirectional power converting device comprises:

a coupling circuit including first and second windings each having first and second ends, the first end of the first winding being adapted to be coupled to the first power storage unit, the first end of the second winding being coupled to the second end of the first winding;

a first switch having a first end coupled to the second end of the first winding, and a grounded second end, the first switch being operable between an ON-state and an OFF-state;

a second switch having a first end coupled to the second end of the first winding, and a second end, the second switch being operable between an ON-state and an OFF-state;

a third switch having a first end coupled to the second end of the second switch, and a second end coupled to the second end of the second winding, the third switch being operable between an ON-state and an OFF-state;

a fourth switch having a first end coupled to the second end of the third switch, and a second end adapted to be coupled to the second power storage unit, the fourth switch being operable between an ON-state and an OFF-state; and a first capacitor coupled between the second end of the second switch and ground.

The first, second, third and fourth switches are operable so that an input voltage supplied by one of the first and second power storage units is converted into an output voltage that is adapted to be supplied to the other one of the first and second power storage units.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
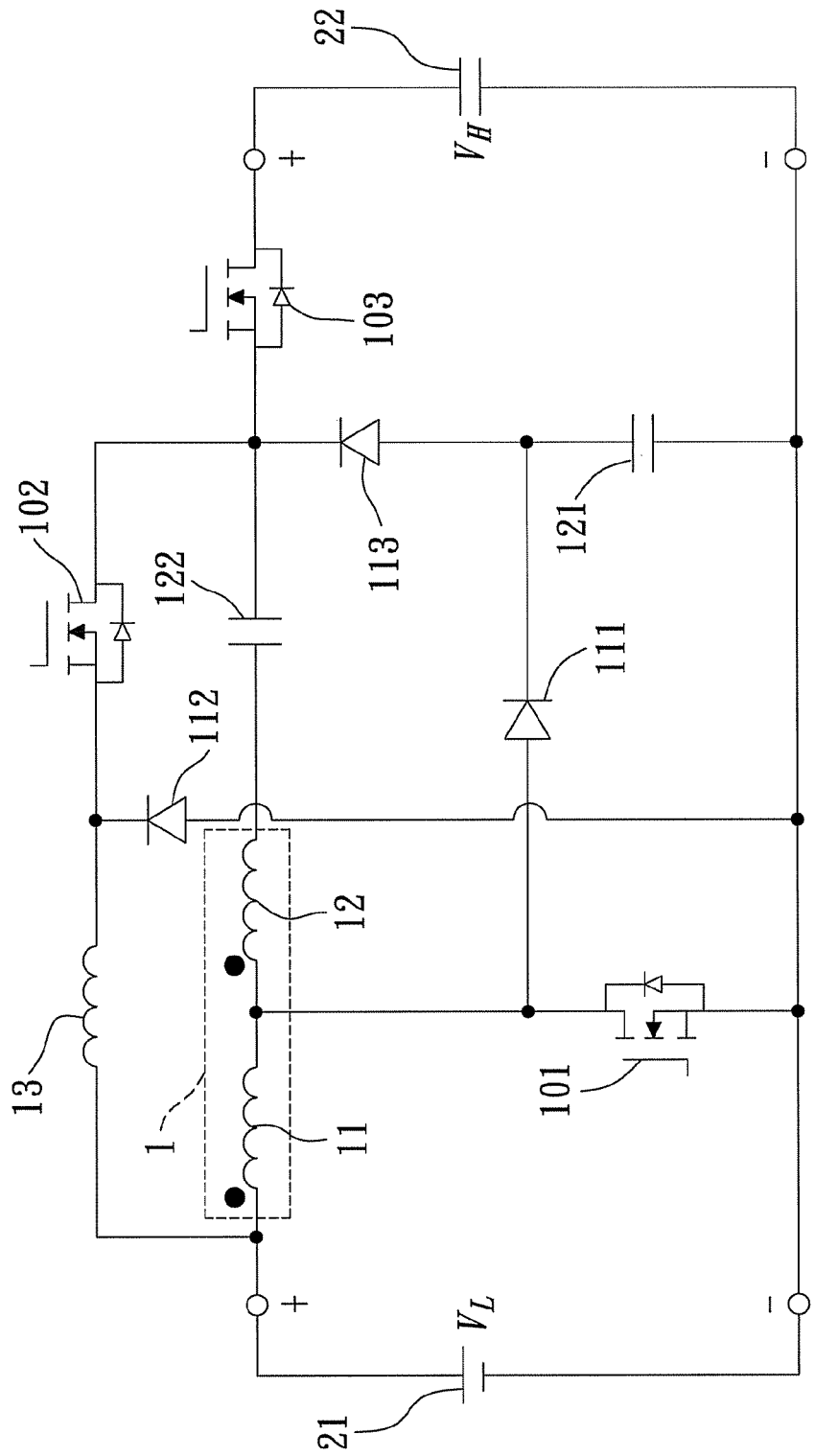
FIG. 1 is a schematic electrical circuit diagram illustrating a conventional bidirectional power converting device.
Figure 2:
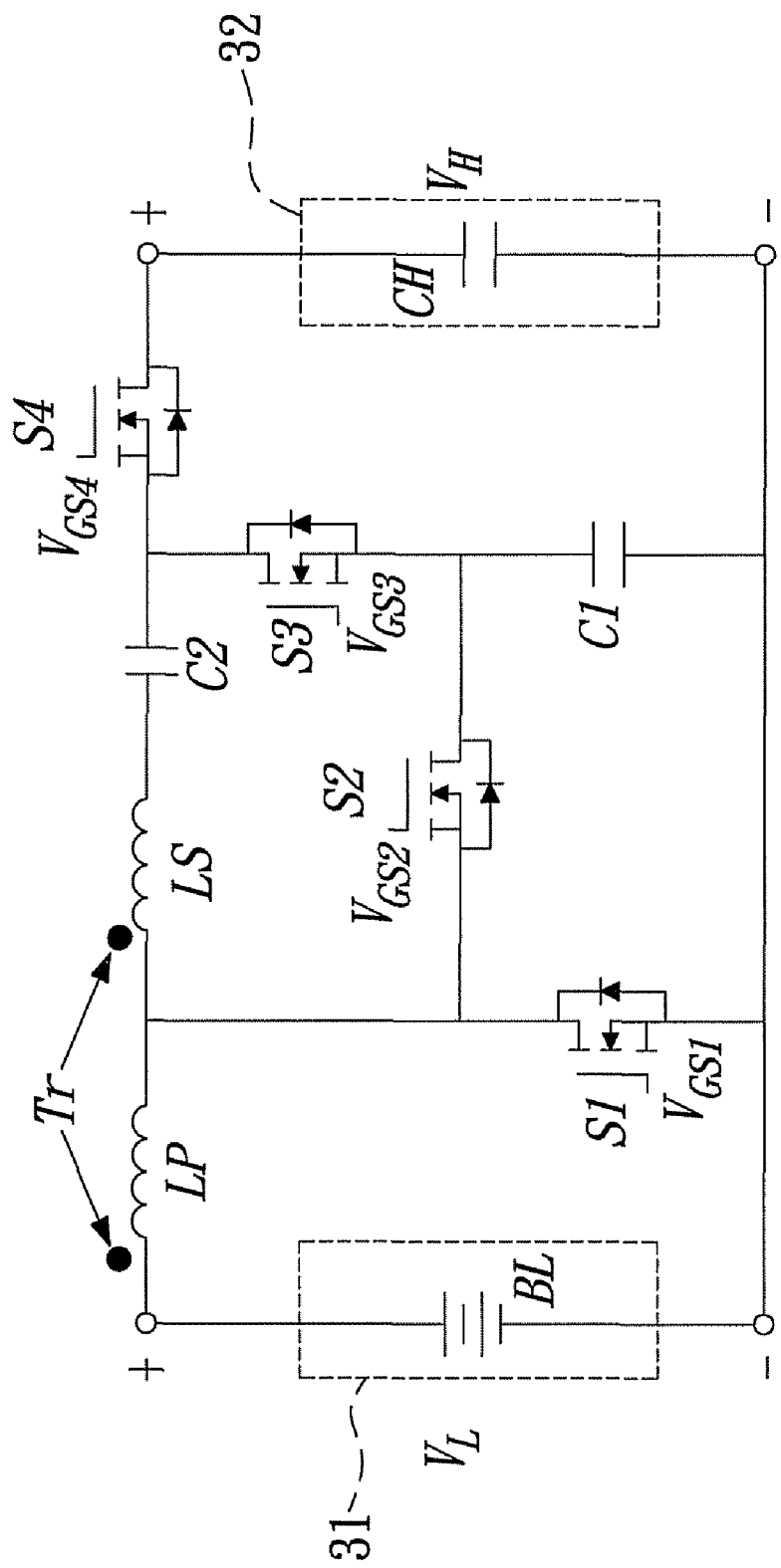
FIG. 2 is a schematic electrical circuit diagram illustrating the preferred embodiment of a bidirectional power converting device according to the present invention.

Referring to FIG. 2, the preferred embodiment of a bidirectional power converting device according to the present invention is shown, and is adapted to be coupled between first and second power storage units 31, 32. In this embodiment, the first power storage unit 31 is a low-voltage storage device and includes a rechargeable battery set (BL). The second power storage unit 12 can be incorporated in a high-voltage bus (not shown) and includes an output capacitor (CH).

The bidirectional power converting device includes a coupling circuit (Tr), a first switch (S1), a second switch (S2), a third switch (S3), a fourth switch (S4), a first capacitor (C1), and a second capacitor (C2).

The coupling circuit 2 includes first and second windings (LP, LS) wound around an iron core (not shown). A winding ratio of the first and second windings (LP, LS) is equal to 1:N. Each of the first and second windings (Ld, Lf) has a polarity end serving as a first end, and a non-polarity end serving as a second end. The polarity end of the first winding (LP) is adapted to be coupled to the rechargeable battery set (BL). The polarity end of the second winding (LS) is coupled to the non-polarity end of the first winding (LP).

The first switch (S1) has a first end coupled to the second end of the first winding (LP), a grounded second end, and a control end for receiving a control signal ($V_{GS1}$). The first switch (LP) is operable to switch between an ON-state and an OFF-state in response to the control signal ($V_{GS1}$).

The second switch (S2) has a first end coupled to the second end of the first winding (LP), a second end, and a control end for receiving a control signal ($V_{GS2}$). The second switch (S2) is operable to switch between an ON-state and an OFF-state in response to the control signal ($V_{GS2}$).

The third switch (S3) has a first end coupled to the second end of the second switch (S2), a second end, and a control end for receiving a control signal ($V_{GS3}$). The third switch (S3) is operable to switch between an ON-state and an OFF-state in response to the control signal ($V_{GS3}$).

The fourth switch (S4) has a first end coupled to the second end of the third switch (S3), a second end adapted to be coupled to the output capacitor (CH), and a control end for receiving a control signal ($V_{GS4}$). The fourth switch (S4) is operable to switch between an ON-state and an OFF-state in response to the control signal ($V_{GS4}$).

The first capacitor (C1) is coupled between the second end of the second switch (S2) and ground.

The second capacitor (C2) is coupled between the second end of the second winding (LS) and the second end of the third switch (S3).

The first, second, third and fourth switches (S1, S2, S3, S4) are operable so that an input voltage supplied by one of the rechargeable battery set (BL) and the output capacitor (CH) is converted into an output voltage that is adapted to be supplied to the other one of the rechargeable battery set (BL) and the output capacitor (CH).

The bidirectional power converting device is capable of performing step-down and step-up conversions. Thus, when the bidirectional power converting device performs the step-down conversion, the input voltage, i.e., $V_H$, is supplied by the output capacitor (CH) for conversion into the output voltage, i.e., $V_L$, that is lower than the input voltage and that is to be supplied to the rechargeable battery set (BL) for charging the rechargeable battery set (BL). In this case, the output capacitor (CH) serves as a power source and the rechargeable battery set (BL) serves as a load. When the bidirectional power converting device performs the step-up conversion, the input voltage, i.e., $V_L$, is supplied by the rechargeable battery set (BL) for conversion into the output voltage, i.e., $V_H$, that is higher than the input voltage and that is to be supplied to the output capacitor (CH) for charging the output capacitor (CH). In this case, the rechargeable battery set (BL) serves as a power source and the output capacitor (CH) serves as a load.

Figure 3:
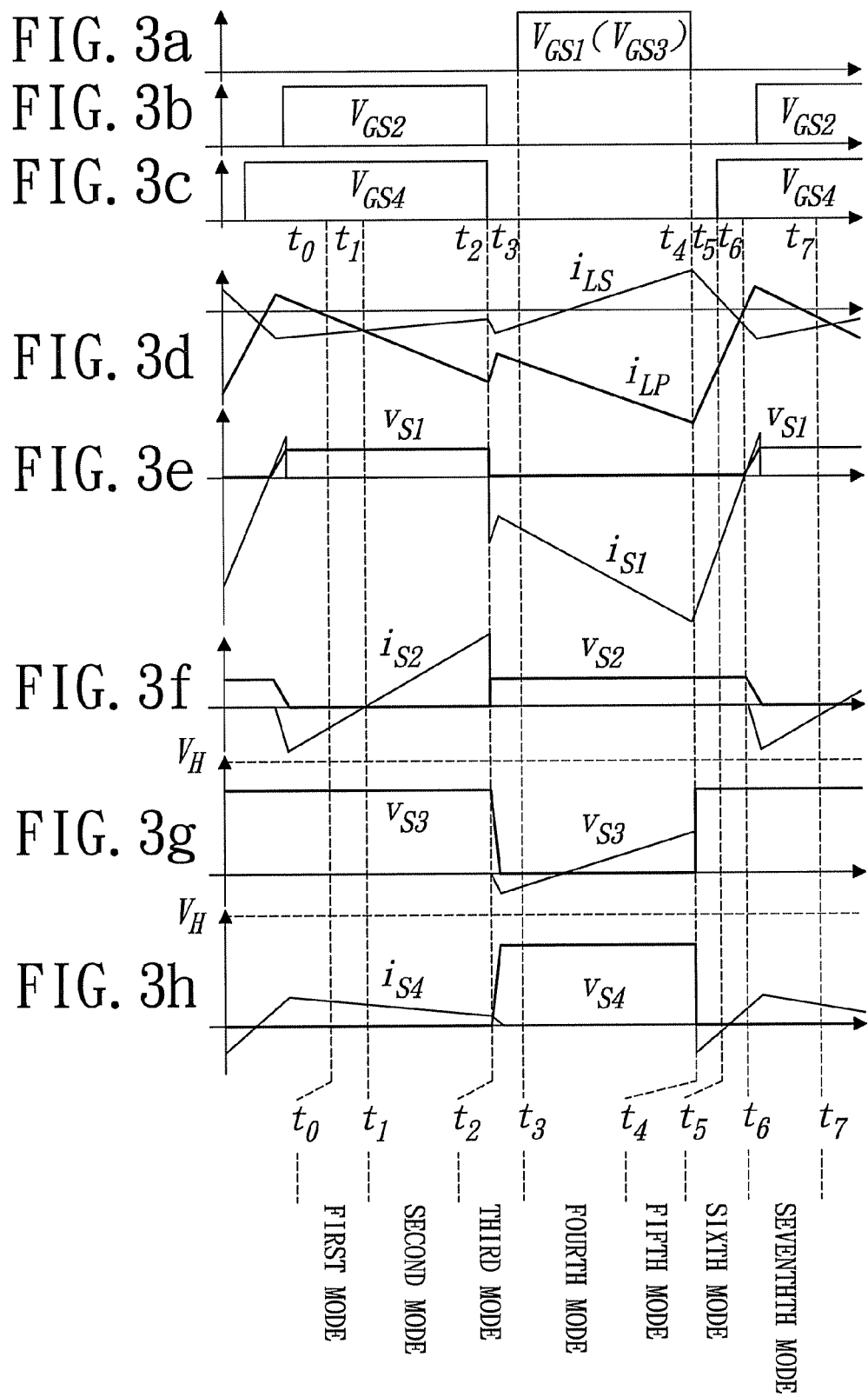
FIG. 3a illustrates a waveform of control signals ($V_{GS1}$, $V_{GS3}$) for first and third switches of the preferred embodiment when the preferred embodiment is operated for step-down conversion.
FIG. 3b illustrates a waveform of a control signal ($V_{GS2}$) for a second switch of the preferred embodiment when the preferred embodiment is operated for step-down conversion.
FIG. 3c illustrates a waveform of a control signal ($V_{GS4}$) for a fourth switch of the preferred embodiment when the preferred embodiment is operated for step-down conversion.
FIG. 3d illustrates waveforms of currents ($i_{LP}$, $i_{LS}$) flowing respectively through first and second windings of a coupling circuit of the preferred embodiment when the preferred embodiment is operated for step-down conversion.
FIG. 3e illustrates waveforms of a current ($i_{S1}$) flowing through the first switch of the preferred embodiment, and a voltage ($v_{S1}$) across the first switch when the preferred embodiment is operated for step-down conversion.
FIG. 3f illustrates waveforms of a current ($i_{S2}$) flowing through the second switch of the preferred embodiment, and a voltage ($v_{S2}$) across the second switch when the preferred embodiment is operated for step-down conversion.
FIG. 3g illustrates waveforms of a current ($i_{S3}$) flowing through the third switch of the preferred embodiment, and a voltage ($v_{S3}$) across the third switch when the preferred embodiment is operated for step-down conversion.
FIG. 3h illustrates waveforms of a current ($i_{S4}$) flowing through the fourth switch of the preferred embodiment, and a voltage ($v_{S4}$) across the fourth switch when the preferred embodiment is operated for step-down conversion.
Figure 4:
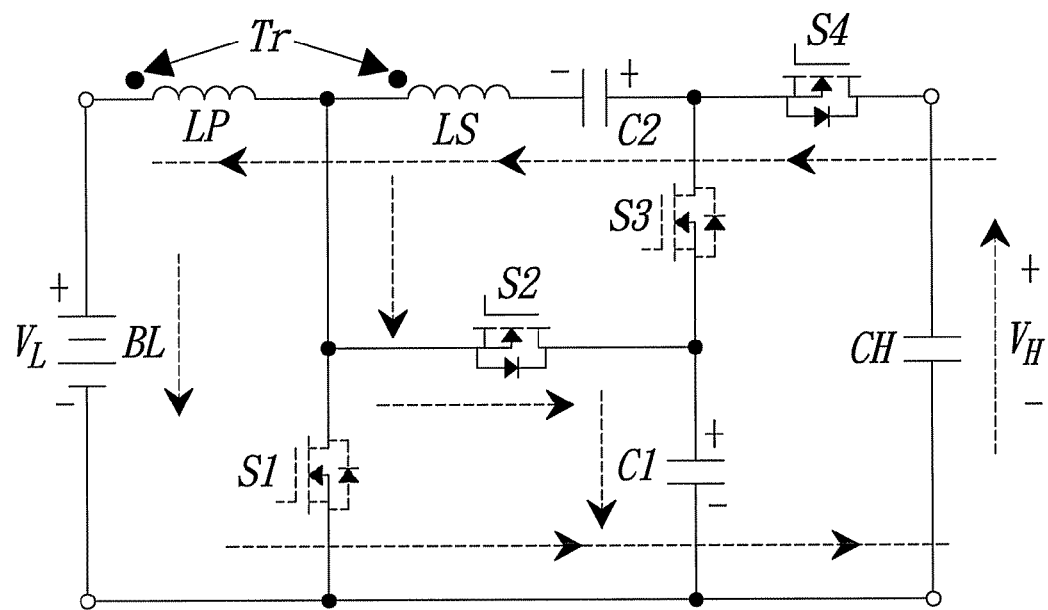
FIGS. 4 to 10 are schematic equivalent electrical circuit diagrams illustrating the preferred embodiment when operated in first, second, third, fourth, fifth, sixth and seventh modes, respectively, during step-down conversion.
Figure 5:
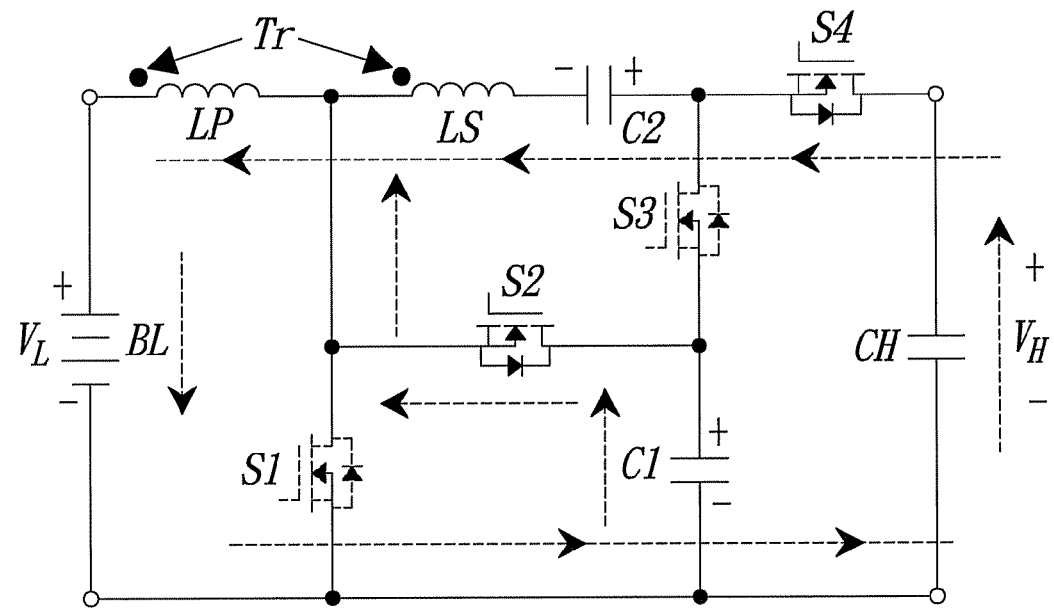
Figure 6:
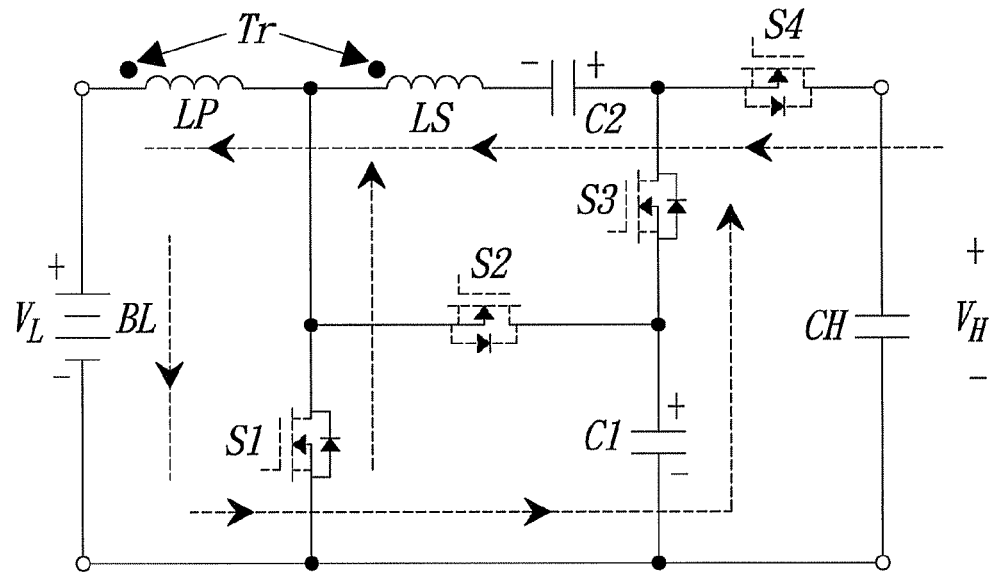
Figure 7:
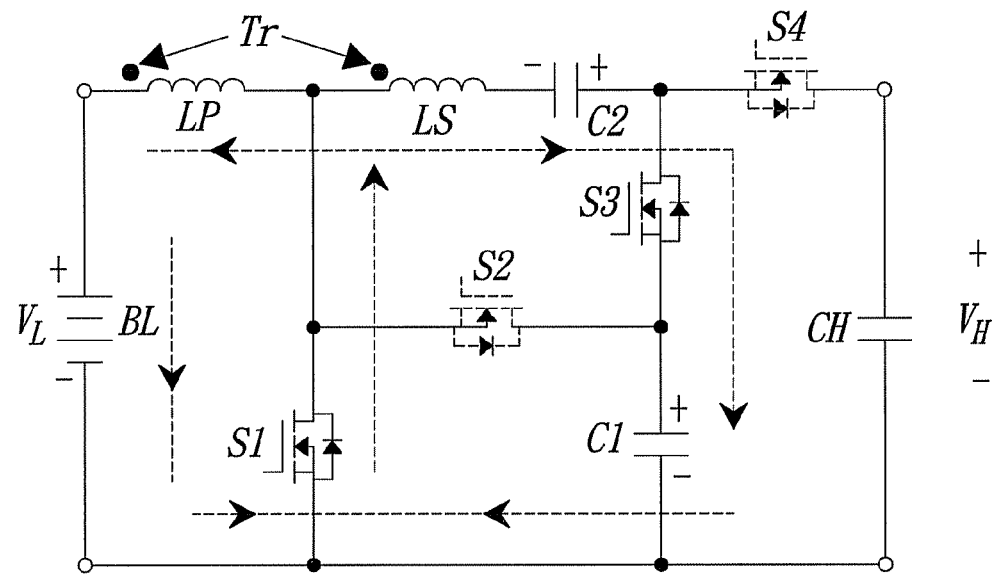
Figure 8:
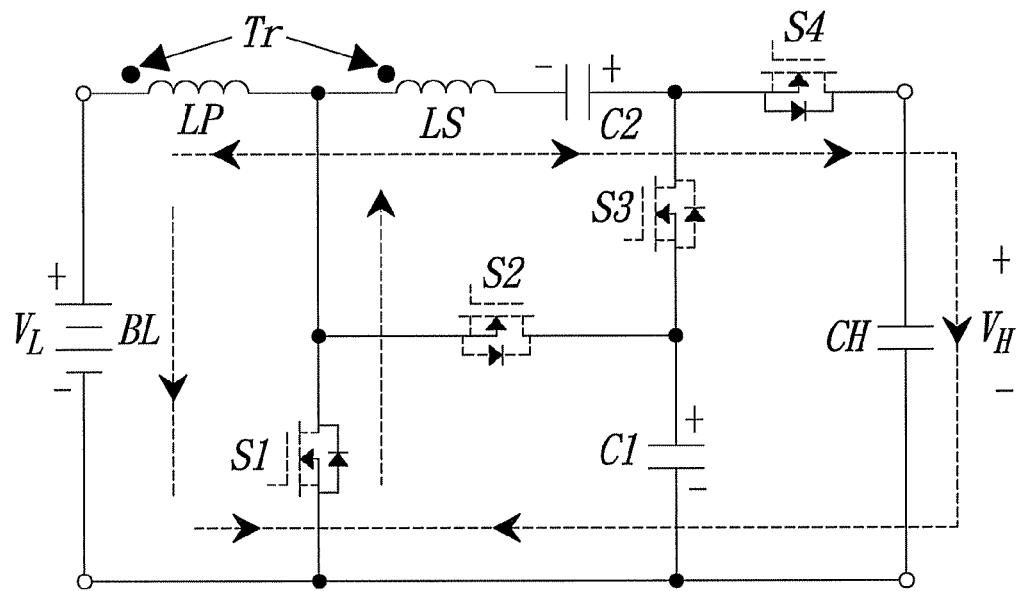
Figure 9:
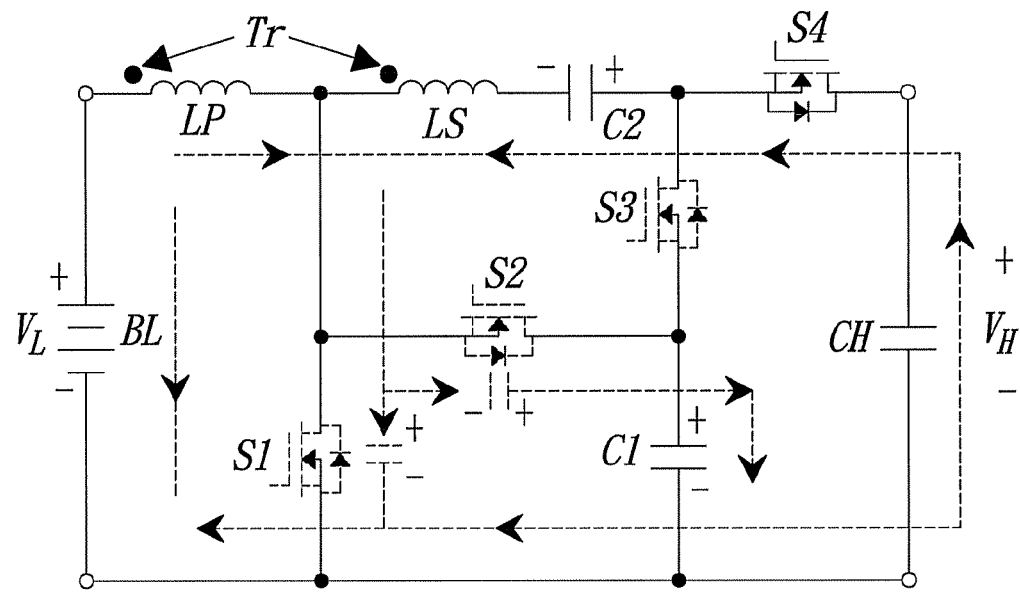
Figure 10:
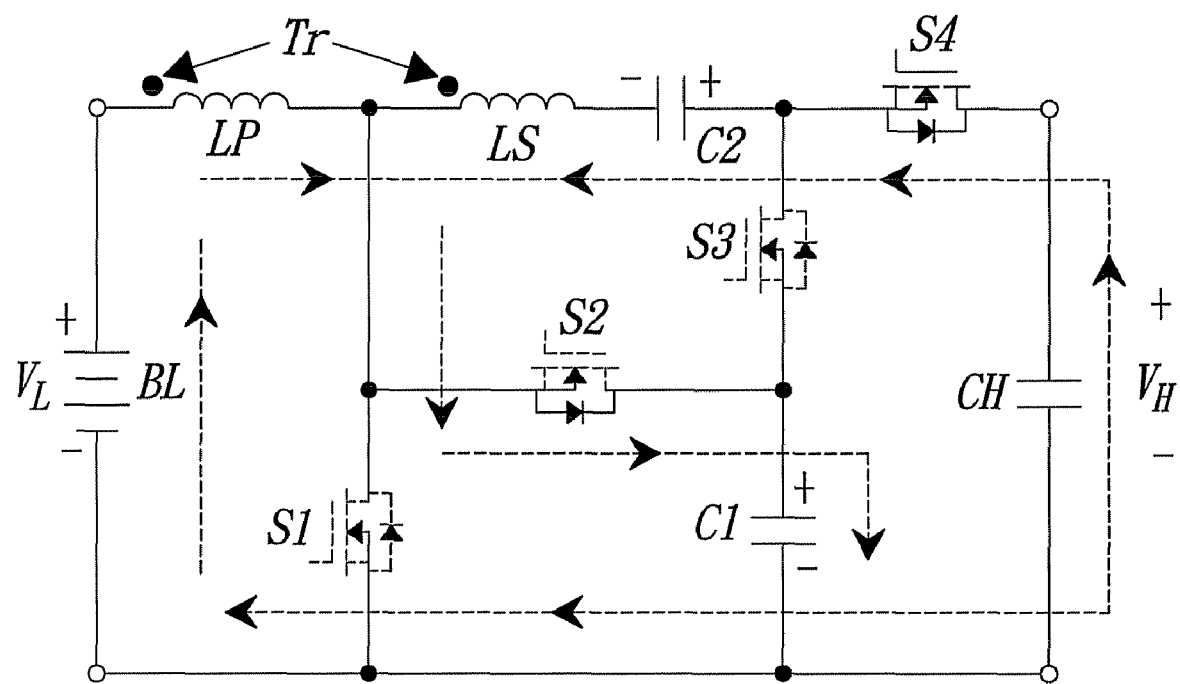

In the step-down conversion, storage and release of energy attributed to the coupling circuit (Tr) are mainly controlled by the fourth switch (S4) so as to regulate the output voltage, i.e., a voltage ($V_L$) across the rechargeable battery set (BL). Referring to FIGS. 3a, 3b and 3c, the controls signals ($V_{GS1}$, $V_{GS2}$, $V_{GS3}$, $V_{GS4}$) for the first, second, third and fourth switches (S1, S2, S3, S4) during the step-down conversion are shown. It is noted that the first and third switches (S1, S3) are simultaneously in the ON-state and have the same duty cycle. Duration of the ON-state of one of the first and fourth switches (S1, S4) does not overlap duration of the ON-state of the other one of the first and fourth switches (S1, S4). Moreover, the second switch (S2) is in the ON-state within duration of the ON-state of the fourth switch (S4).

Figure 11:
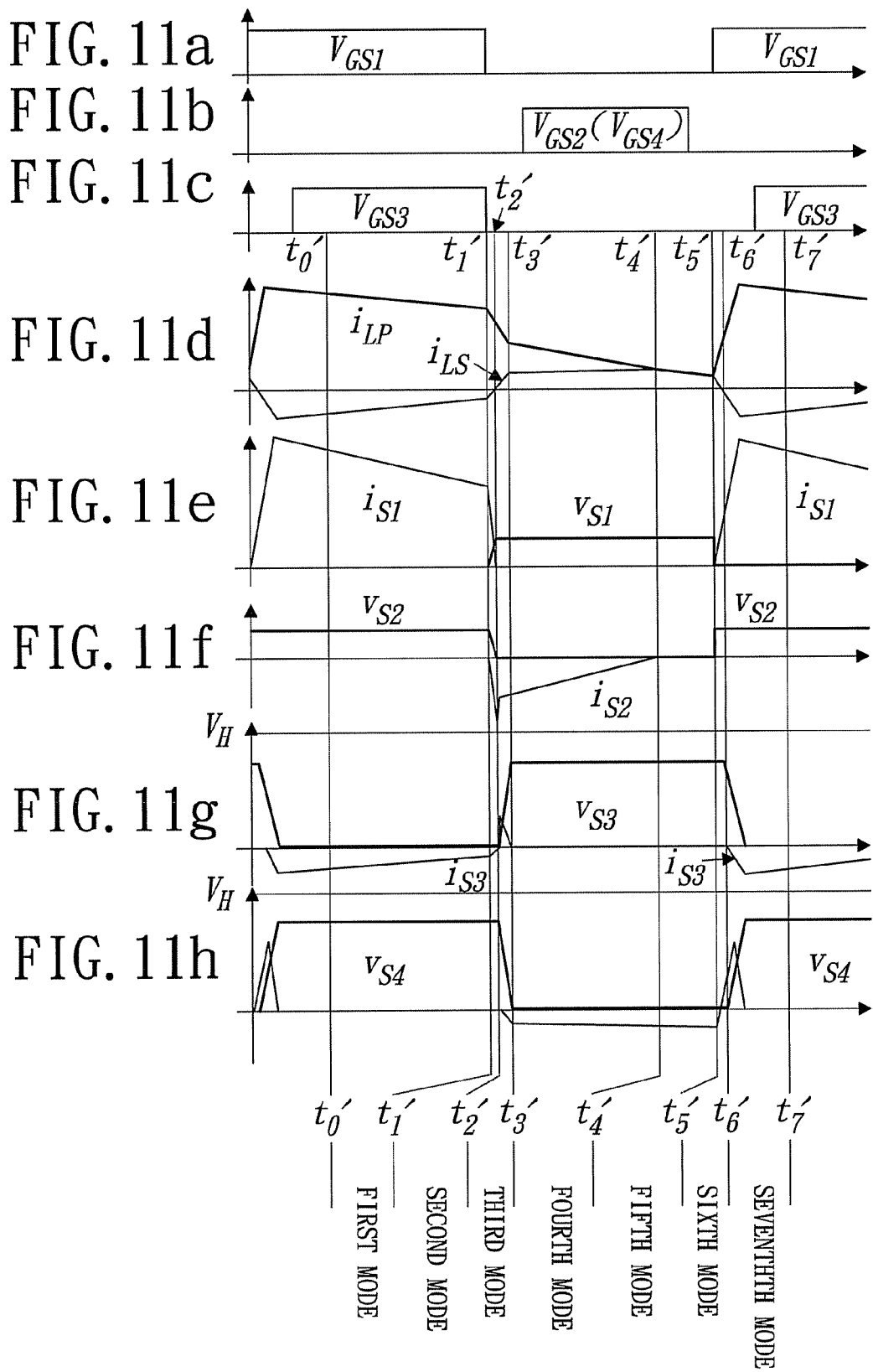
FIG. 11a illustrates a waveform of the control signal ($V_{GS1}$) for the first switch when the preferred embodiment is operated for step-up conversion.
FIG. 11b illustrates a waveform of the control signals ($V_{GS2}$, $V_{GS4}$) for the second and fourth switches when the preferred embodiment is operated for step-up conversion.
FIG. 11c illustrates a waveform of the control signal ($V_{GS3}$) for the third switch when the preferred embodiment is operated for step-up conversion.
FIG. 11d illustrates waveforms of the currents ($i_{LP}$, $i_{LS}$) flowing respectively through the first and second windings when the preferred embodiment is operated for step-up conversion.
FIG. 11e illustrates waveforms of the current ($i_{S1}$) flowing through the first switch, and the voltage ($v_{S1}$) across the first switch when the preferred embodiment is operated for step-up conversion.
FIG. 11f illustrates waveforms of the current ($i_{S2}$) flowing through the second switch, and the voltage ($v_{S2}$) across the second switch when the preferred embodiment is operated for step-up conversion.
FIG. 11g illustrates waveforms of the current ($i_{S3}$) flowing through the third switch, and the voltage ($v_{S3}$) across the third switch when the preferred embodiment is operated for step-up conversion.
FIG. 11h illustrates waveforms of the current ($i_{S4}$) flowing through the fourth switch, and the voltage ($v_{S4}$) across the fourth switch when the preferred embodiment is operated for step-up conversion.
Figure 12:
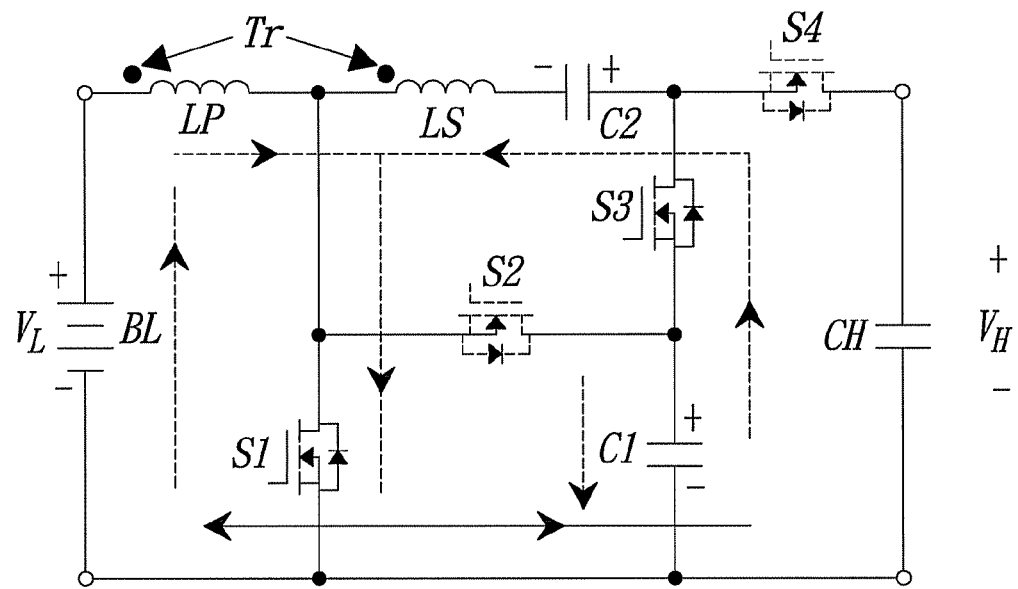
FIGS. 12 to 18 are schematic equivalent electrical circuit diagrams illustrating the preferred embodiment when operated in first, second, third, fourth, fifth, sixth and seventh modes, respectively, during step-up conversion.
Figure 13:
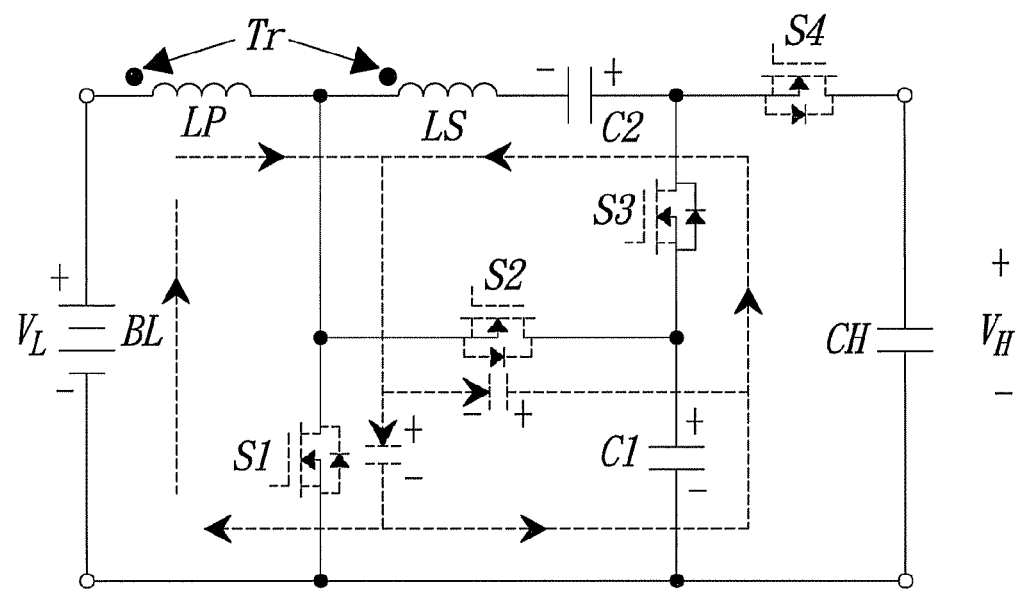
Figure 14:
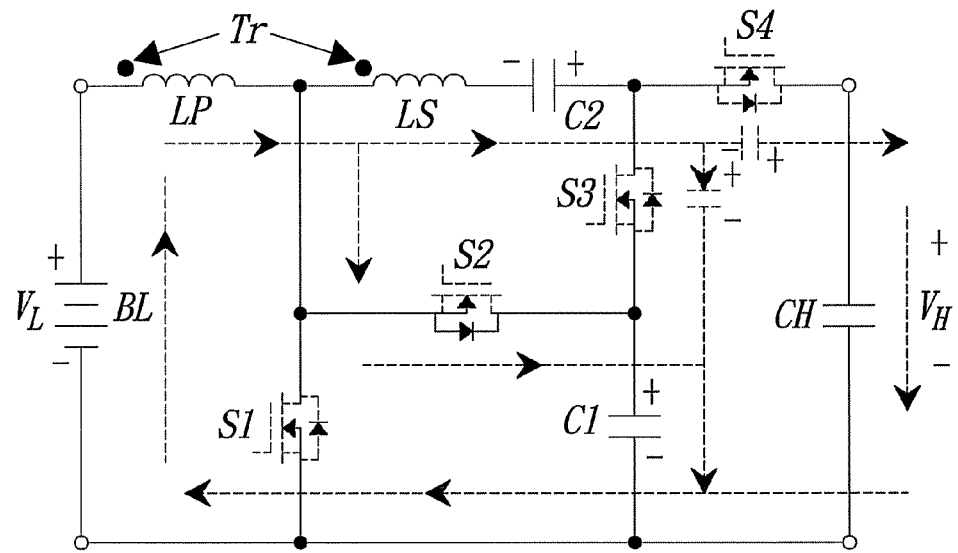
Figure 15:
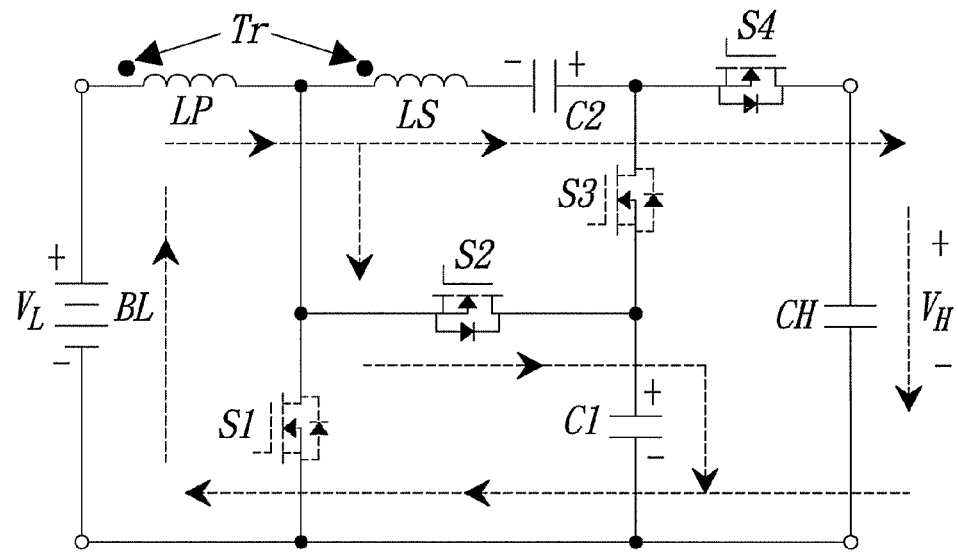
Figure 16:
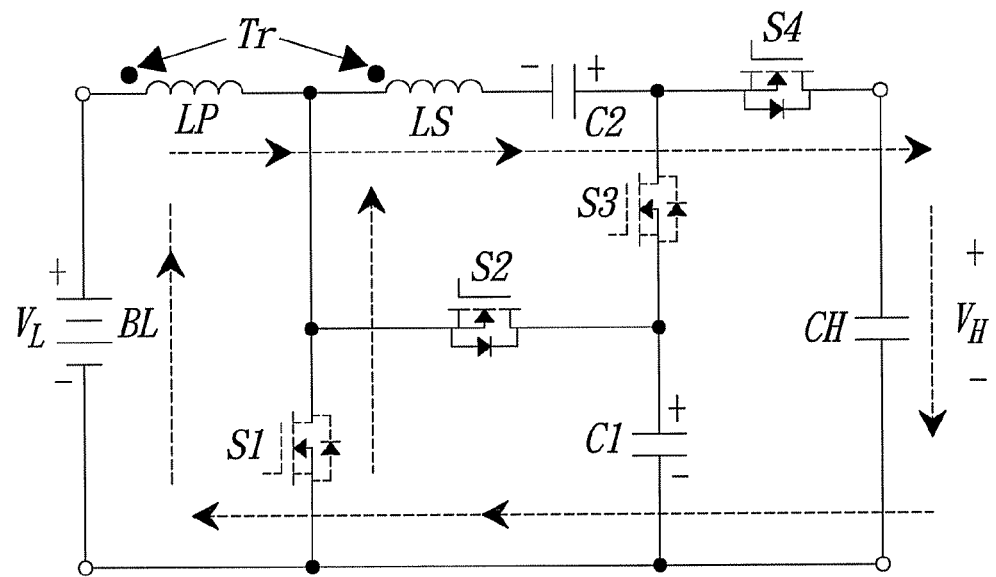
Figure 17:
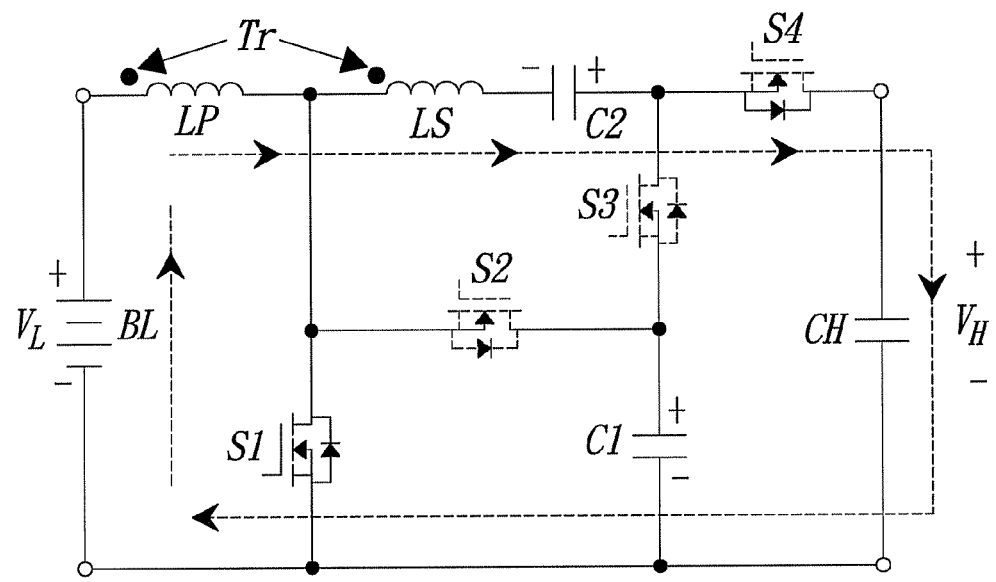
Figure 18:
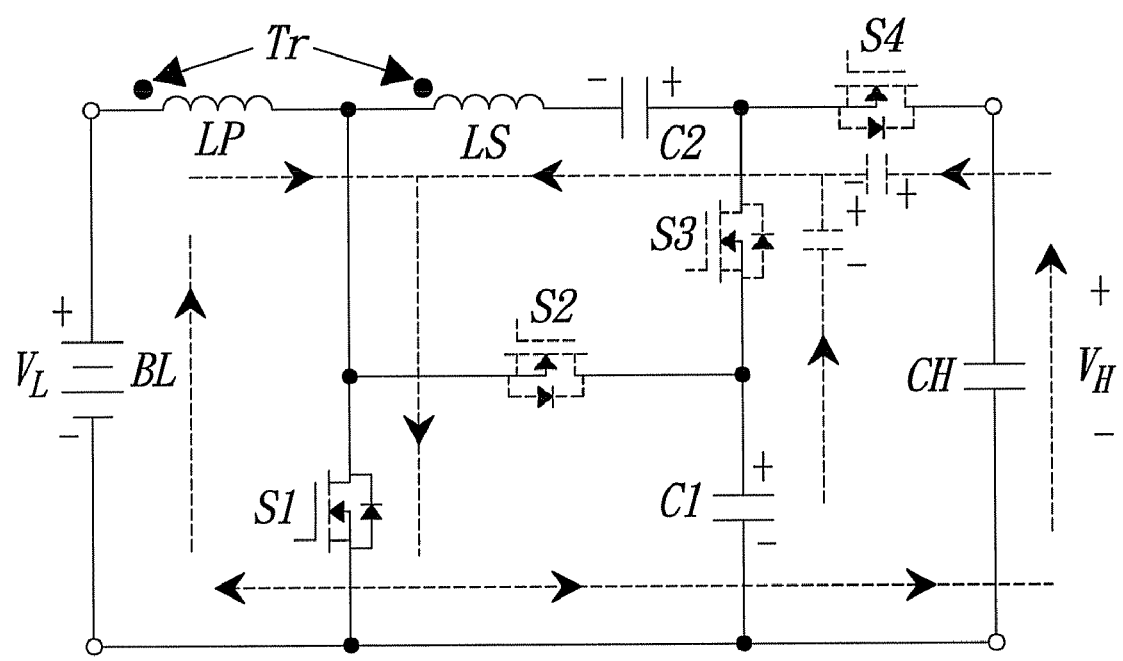

In the step-up conversion, storage and release of energy attributed to the coupling circuit (Tr) are mainly controlled by the first switch (S1) so as to regulate the output voltage, i.e., a voltage ($V_H$) across the output capacitor (CH). Referring to FIGS. 11a, 11b and 11c, the controls signals ($V_{GS1}$, $V_{GS2}$, $V_{GS3}$, $V_{GS4}$) for the first, second, third and fourth switches (S1, S2, S3, S4) during the step-up conversion are shown. It is noted that the second and fourth switches (S2, S4) are simultaneously in the ON-state and have the same duty cycle. Duration of the ON-state of one of the first and second switches (s1, S2) does not overlap duration of the ON-state of the other one of the first and second switches (S1, S2). Moreover, the third switch (S3) is in the ON-state within duration of the ON-state of the first switch (S1). The bidirectional power converting device of the preferred embodiment is operable, during step-down conversion, among first to seventh modes based on the control signals ($V_{GS1}$, $V_{GS2}$, $V_{GS3}$, $V_{GS4}$) for the first, second, third and fourth switches (S1, S2, S3, S4) shown in FIGS. 3a, 3b and 3c. FIG. 3d illustrates waveforms of currents ($i_{LP}$, $i_{LS}$) flowing respectively through the first and second windings (LP, LS). FIG. 3e illustrates waveforms of a current ($i_{S1}$) flowing through the first switch (S1), and a voltage ($v_{S1}$) across the first switch (S1) during step-down conversion. FIG. 3f illustrates waveforms of a current ($i_{S2}$) flowing through the second switch (S2), and a voltage ($v_{S2}$) across the second switch (S2) during step-down conversion. FIG. 3g illustrates waveforms of a current ($i_{S3}$) flowing through the third switch (S3), and a voltage ($v_{S3}$) across the third switch (S3) during step-down conversion. FIG. 3h illustrates waveforms of a current ($i_{S4}$) flowing through the fourth switch (S4), and a voltage ($v_{S4}$) across the fourth switch (S4) during step-down conversion.

The following describes operations of the bidirectional power converting device during step-down conversion.

Referring further to FIGS. 3a to 3h, and 4, the bidirectional power converting device is operated in the first mode during a period from $t_0$ to $t_1$. In the first mode, the second and fourth switches (S2, S4) are in the ON-state, and the first and third switches (S1, S3) are in the OFF-state. The output capacitor (CH) supplies a current flowing through the fourth switch (S4), the second capacitor (C2) and the second winding (LS). Then, the current supplied by the output capacitor (CH) is divided into first and second current parts, wherein the rechargeable battery set (BL) is charged with the first current part, and the second current part flows through the second switch (S3) to charge the first capacitor (C1). In this case, the relationship between a voltage ($v_{LP}$) across the first winding (LP) and a voltage ($v_{LS}$) across the second winding (LS) is represented as follows:

$$v_{LS}/v_{LP}=N \qquad \text{(Equation 1)}$$

Therefore, the voltage ($V_H$) across the output capacitor (CH), and the voltage ($v_{S1}$) across the first switch (S1) can be represented as follows:

$$V_H=v_{C2}+v_{LS}+v_{LP}+V_L=(N+1)v_{LP}+v_{C2}+V_L \qquad \text{(Equation 2)}$$

$$v_{S1}=V_L+v_{LP}=v_{C1} \qquad \text{(Equation 3)}$$

where $v_{C1}$ represents a voltage across the first capacitor (C1), and $v_{C2}$ represents a voltage across the second capacitor (C2).

Referring further to FIGS. 3a to 3h, and 5, the bidirectional power converting device is operated in the second mode during a period from $t_1$ to $t_2$. In the second mode, the second and fourth switches (S2, S4) are in the ON-state, and the first and third switches (S1, S3) are in the OFF-state. The first capacitor (C1) begins to discharge through the second switch (S2) and the first winding (LP) to the rechargeable battery set (BL). In this case, the current ($i_{S2}$) flowing through the second switch (S2) is reversed.

Referring further to FIGS. 3a to 3h, and 6, the bidirectional power converting device is operated in the third mode during a period from $t_2$ to $t_3$. In the third mode, all the first, second, third and fourth switches (S1, S2, S3, S4) are in the OFF-state. When the fourth switch (S4) is switched from the ON-state to the OFF-state at $t_2$, energy attributed to leakage inductances of the first and second windings (LP, LS) is released such that the current ($i_{LP}$) flowing through the first winding (LP) flows through a substrate diode of the first switch (S1) and that the current ($i_{LS}$) flowing through the second winding (LS) flows through the first capacitor (C1) and a substrate diode of the third switch (S3). As such, the voltages ($v_{S1}$, $v_{S3}$) across the first and third switches (S1, S3) are zero.

Referring further to FIGS. 3a to 3h, and 7, the bidirectional power converting device is operated in the fourth mode during a period from $t_3$ to $t_4$. In the fourth mode, the first and third switches (S1, S3) are in the ON-state, the second and fourth switches (S2, S4) are in the OFF-state, and synchronous rectification with low conduction loss can be achieved. When energy attributed to the leakage inductance of the second winding (LS) is fully released, the current ($i_{S3}$) flowing through the third switch (S3) is reversed, and the third switch (S3) is in zero-voltage conduction without switching loss. At the same time, the second capacitor (C2) discharges to the second winding (LS) such that the rechargeable battery set (BL) is charged with an induced current flowing through the first winding (LP).

If duration of crossover between the first and fourth switches (S1, S4) is ignored, the relationship between duty cycles ($d_4$, $d_1$) of the fourth and first switches (S4, S1) is represented as follows:

$$d_4+d_1=1 \qquad \text{(Equation 4)}$$

In this case, the voltage ($v_{LP}$) across the first winding (LP) is equal to $V_L$. According to volt-second balance, the voltage ($v_{LP}$) across the first winding (LP) is represented as follows:

$$v_{LP}=V_L \times [(1-d_4)/d_4] \qquad \text{(Equation 5)}$$

According to Equations 3 and 5, the voltage ($v_{C1}$) across the first capacitor (C1) can be represented as follows:

$$v_{C1}=V_L+v_{LP}=V_L/d_4=v_{S1} \qquad \text{(Equation 6)}$$

According to Equations 1, 5 and 6, the voltage ($v_{C2}$) across the second capacitor (C2) can be represented as follows:

$$v_{C2}=v_{LS}-v_{C1}=Nv_{LP}-V_L/d_4=V_L(N+1/d_4) \qquad \text{(Equation 7)}$$

Therefore, using Equations 2, 5 and 7, a gain ratio ($G_{V1}$) of the bidirectional power converting device during step-down conversion is determined according to the following Equation 8:

$$G_{V1}=V_L/V_H=d_4/(N+2) \qquad \text{(Equation 8)}$$

According to Equations 6 and 8, the voltages ($v_{S1}$, $v_{S2}$) across the first and second switches (S1, S2) can be represented as follows:

$$v_{S1}=V_H/(N+2)=v_{C1}=v_{S2} \qquad \text{(Equation 9)}$$

As such, when N is fixed, the voltages ($v_{S1}$, $v_{S2}$) across the first and second switches (S1, S2) are related to the voltage ($V_H$) across the output capacitor (CH), and are not related to the duty cycle ($d_4$) of the fourth switch (S4) and the voltage ($V_L$) across the rechargeable battery set (BL). Thus, a MOSFET with low-voltage conduction and low conduction loss can serve as the first and second switches (S1, S2).

Referring further to FIGS. 3a to 3h, and 8, the bidirectional power converting device is operated in the fifth mode during a period from $t_4$ to $t_5$. In the fifth mode, all the first, second, third and fourth switches (S1, S2, S3, S4) are in the OFF-state. When the first and third switches (S1, S3) are switched from the ON-state to the OFF-state at $t_4$, energy attributed to the leakage inductances of the first and second windings (LP, LS) is released such that the current ($i_{LP}$) flowing through the first winding (LP) flows through the substrate diode of the first switch (S1) and that the current ($i_{LS}$) flowing through the second winding (LS) flows to the output capacitor (CH) through the second capacitor (C2) and a substrate diode of the fourth switch (S4). As such, the voltages ($v_{S1}$, $v_{S4}$) across the first and fourth switches (S1, S4) are zero.

Referring further to FIGS. 3a to 3h, and 9, the bidirectional power converting device is operated in the sixth mode during a period from $t_5$ to $t_6$. In the sixth mode, the fourth switch (S4) is in the ON-state, and the first, second and third switches (S1, S2, S3) are in the OFF-state. Since the substrate diode of the fourth switch (S4) conducts, the fourth switch (S4) has zero-voltage switching characteristics. When the leakage inductances of the first and second windings (LP, LS) are fully released, the currents ($i_{LP}$, $i_{LS}$) flowing through the first and second windings (LP, LS) are reversed such that a parasitic capacitance of the first switch (S1) is charged and that a parasitic capacitance of the second switch (S2) discharges.

Referring further to FIGS. 3a to 3h, and 10, the bidirectional power converting device is operated in the seventh mode during a period from $t_6$ to $t_7$. In the seventh mode, the fourth switch (S4) is in the ON-state, the second switch (S2) is switched from the OFF-state to the ON-state, and the first and third switches (S1, S3) are in the OFF-state. The coupling circuit (Tr) has the same operation as that in the sixth mode. When the voltage ($v_{S1}$) across the first switch (S1) is greater than the voltage ($v_{C1}$) across the first capacitor (C1), a substrate diode of the second switch (S2) conducts. Thus, the second switch (S2) has zero-current switching characteristics and synchronous rectification effect. When the current ($i_{LP}$) flowing through the first winding (LP) is reversed, the bidirectional power converting device is switched from the seventh mode back to the first mode.

The bidirectional power converting device of the preferred embodiment is operable, during step-up conversion, among first to seventh modes based on the control signals ($V_{GS1}$, $V_{GS2}$, $V_{GS3}$, $V_{GS4}$) for the first, second, third and fourth switches (S1, S2, S3, S4) shown in FIGS. 11a, 11b and 11c. FIG. 11d illustrates waveforms of the currents ($i_{LP}$, $i_{LS}$) flowing respectively through the first and second windings (LP, LS). FIG. 11e illustrates waveforms of the current ($i_{S1}$) flowing through the first switch (S1), and the voltage ($v_{S1}$) across the first switch (S1) during step-up conversion. FIG. 11f illustrates waveforms of the current ($i_{S2}$) flowing through the second switch (S2), and the voltage ($v_{S2}$) across the second switch (S2) during step-up conversion. FIG. 11g illustrates waveforms of the current ($i_{S3}$) flowing through the third switch (S3), and the voltage ($v_{S3}$) across the third switch (S3) during step-up conversion. FIG. 11h illustrates waveforms of the current ($i_{S4}$) flowing through the fourth switch (S4), and the voltage ($v_{S4}$) across the fourth switch (S4) during step-up conversion.

The following describes operations of the bidirectional power converting device during step-up conversion.

Referring further to FIGS. 11a to 11h, and 12, the bidirectional power converting device is operated in the first mode during a period from $t_0'$ to $t_1'$. In the first mode, the first and third switches (S1, S2) are in the ON-state, and the second and fourth switches (S2, S4) are in the OFF-state. The current ($i_{S1}$) across the first switch (S1) includes a current flowing from the rechargeable battery set (BL) to the first winding (LP), and a current flowing from the first capacitor (C1) through the third switch (S3) and the second winding (LS) to charge the second capacitor (C2), wherein the current ($i_{LP}$) flowing through the first winding (LP) includes an induced current and an exciting current. In this case, the voltage ($v_{C2}$) across the second capacitor (C2) is represented as follows:

$$v_{C2}=NV_L+v_{C1} \qquad \text{(Equation 10)}$$

Referring further to FIGS. 11a to 11h, and 13, the bidirectional power converting device is operated in the second mode during a period from $t_1'$ to $t_2'$. In the second mode, all the first, second, third and fourth switches (S1, S2, S3, S4) are in the OFF-state. When the first and third switches (S1, S3) are switched from the ON-state to the OFF-state at $t_1'$, the substrate diode of the third switch (S3) conducts to ensure flow of the current ($i_{LS}$) through the second winding (LS). In this case, the parasitic capacitance of the first switch (S1) is charged with the current ($i_{LP}$) flowing through the first winding (LP) and the current ($i_{LS}$) flowing through the second winding (LS). Thus, the voltage ($v_{S1}$) across the first switch (S1) quickly rises and the parasitic capacitance of the second switch (S2) discharges until the voltage ($v_{S1}$) across the first switch (S1) is equal to the voltage ($v_{C1}$) across the first capacitor (C1).

Referring further to FIGS. 11a to 11h, and 14, the bidirectional power converting device is operated in the third mode during a period from $t_2'$ to $t_3'$. In the third mode, all the first, second, third and fourth switches (S1, S2, S3, S4) are in the OFF-state. When the voltage ($v_{S1}$) across the first switch (S1) is greater than the voltage ($v_{C1}$) across the first capacitor (C1), the substrate diode of the second switch (S2) conducts such that energy attributed to the leakage inductance of the first winding (LP) is released to charge the first capacitor (C1). In this case, the relationship between the voltage ($v_{C1}$) across the first capacitor (C1) and the voltage ($V_L$) across the rechargeable battery set (BL) is represented as follows:

$$v_{C1}=V_L+v_{LP}=v_{S1}=V_L/(1-d_1)=v_{S2} \quad \text{(Equation 11)}$$

where $d_1$ is a duty cycle of the first switch (S1). At the same time, the current ($i_{LS}$) flowing through the second winding (LS) is reversed to charge the parasitic capacitance of the third switch (S3), the parasitic capacitance of the fourth switch (S4) discharges, and the third switch (S3) and the fourth switch (S4) clamp each other since $v_{S3}+v_{S4}=V_H-v_{C1}$. Hence, each of the voltages ($v_{S3}$, $v_{S4}$) across the third and fourth switches (S3, S4) has a maximum value equal to $V_H-v_{C1}$.

Referring further to FIGS. 11a to 11h, and 15, the bidirectional power converting device is operated in the fourth mode during a period from $t_3'$ to $t_4'$. In the fourth mode, the first and third switches (S1, S3) are in the OFF-state, and the second and fourth switches (S2, S4) are simultaneously switched from the OFF-state to the ON-state. When the substrate diodes of the second and fourth switches (S2, S4) conduct, the second and fourth switches (S2, S4) are in the ON-state, thereby achieving synchronous rectification and reducing conduction loss. In this case, the voltage ($v_{LS}$) across the second winding (LS) is represented as follows:

$$v_{LS}=Nv_{LP}=d_1NV_L/(1-d_1) \quad \text{(Equation 12)}$$

Using Equations 10, 11 and 12, the voltage ($V_H$) across the output capacitor (CH) is represented as follows:

$$V_H=V_L+v_{LP}+v_{C2}+v_{LS}=(2+N)V_L/(1-d_1) \quad \text{(Equation 13)}$$

Therefore, a gain ratio ($G_{V2}$) of the bidirectional power converting device during step-up conversion is determined according to the following Equation 14:

$$G_{V2}=V_H/V_L=(2+N)/(1-d_1) \quad \text{(Equation 14)}$$

According to Equations 11 and 14, the voltage ($v_{S1}$) across the first switch (S1) can be represented as follows:

$$v_{S1}=V_H/(N+2)=v_{C1}=v_{S2} \quad \text{(Equation 15)}$$

As such, when N is fixed, the voltages ($v_{S1}$, $v_{S2}$) across the first and second switches (S1, S2) are related to the voltage ($V_H$) across the output capacitor (CH), and are not related to the duty cycle ($d_1$) of the first switch (S1). Since the maximum value of each of the voltages ($v_{S3}$, $v_{S4}$) across the third and fourth switches (S3, S4) is equal to $V_H-v_{C1}$, and since $v_{C1}=v_{S1}=v_{S2}$, the maximum value of each of the voltages ($v_{S3}$, $v_{S4}$) across the third and fourth switches (S3, S4) is fixed and is smaller than $V_H$.

When the current ($i_{LP}$) flowing through the first winding (LP) is equal to the current ($i_{LS}$) flowing through the second winding (LS), the bidirectional power converting device is switched from the fourth mode to the fifth mode.

Referring further to FIGS. 11a to 11h, and 16, the bidirectional power converting device is operated in the fifth mode during a period from $t_4'$ to $t_5'$. In the fifth mode, the first and third switches (S1, S3) are in the OFF-state, and the second and fourth switches (S2, S4) are simultaneously switched from the ON-state to the OFF-state. When the current ($i_{LP}$) flowing through the first winding (LP) is equal to the current ($i_{LS}$) flowing through the second winding (LS), energy attributed to the leakage inductances of the first and second windings (LP, LS) is released to the output capacitor (CH) through the fourth switch (S4) that is in the ON-state. In this case, the currents ($i_{S1}$, $i_{S2}$, $i_{S3}$) across the first, second and third switches (S1, S2, S3) are zero.

Referring further to FIGS. 11a to 11h, and 17, the bidirectional power converting device is operated in the sixth mode during a period from $t_5'$ to $t_6'$. In the sixth mode, the first switch (S1) is in the ON-state, and the second, third and fourth switches (S2, S3, S4) are in the OFF-state. When the first switch (S1) is switched from the OFF-state to the ON-state at $t_5'$, a rising slope of the current ($i_{LP}$) flowing through the first winding (LP) is limited by the leakage inductance, and the current ($i_{LS}$) flowing through the second winding (LS) reduces to zero as a result of the leakage inductance of the second winding (LS). Since the currents ($i_{LP}$, $i_{LS}$) flowing through the first and second windings (LP, LS) clamp each other, the substrate diode of the fourth switch (S4) conducts such that the fourth switch (S4) has zero-current switching characteristics. In this case, the first switch (S1) has soft switching characteristics when switching from the OFF-state to the ON-state, thereby effectively reducing switching loss.

Referring further to FIGS. 11a to 11h, and 18, the bidirectional power converting device is operated in the seventh mode during a period from $t_6'$ to $t_7'$. In the seventh mode, the first switch (S1) is in the ON-state, the second and fourth switches (S2, S4) are in the OFF-state, and the third switch (S3) is switched from the OFF-state to the ON-state. When energy attributed to the leakage inductance of the second winding (LS) is fully released, the current ($i_{LS}$) flowing through the second winding (LS) is reversed to flow to the first switch (S1) such that the parasitic capacitance of the third switch (S3) discharges and the parasitic capacitance of the fourth switch (S4) is charged and that the third and fourth switches (S3, S4) clamp each other. Therefore, when the substrate diode of the third switch (S3) conducts, the third switch (S3) is switched from the OFF-state to the ON-state such that the voltage ($v_{S4}$) across the fourth switch (S4) is $V_H-v_{C1}$.

FIGS. 19 to 23 illustrate experimental measurement results when the bidirectional power converting device of the preferred embodiment is operated during step-down conversion under the voltage ($V_H$) of 200V, the voltage ($V_L$) of 24V and an output power of 500 W.

Figure 19:
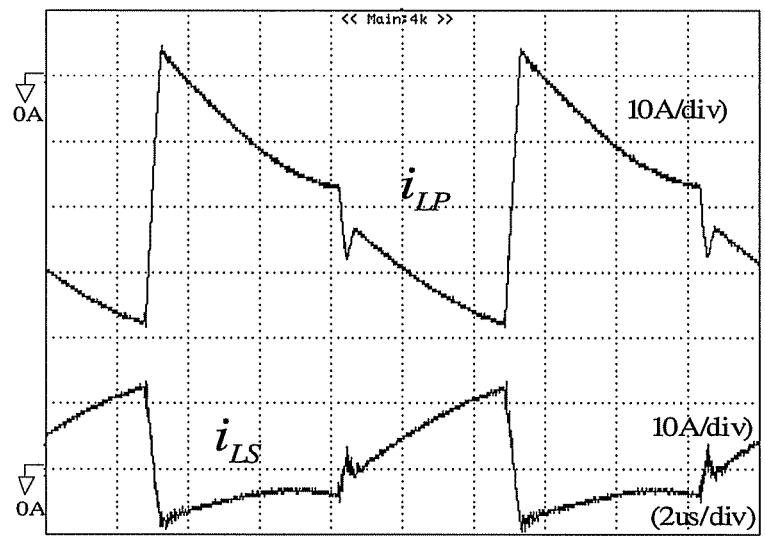
FIG. 19 is a plot illustrating experimental measurement results of the currents ($i_{LP}$, $i_{LS}$) flowing respectively through the first and second windings when the preferred embodiment is operated for step-down conversion.

As shown in FIG. 19, the current ($i_{LP}$) flowing through the first winding (LP) is a negative charging current for the rechargeable battery set (BL), and the current ($i_{LS}$) flowing through the first winding (LS) is bidirectional.

Figure 20:
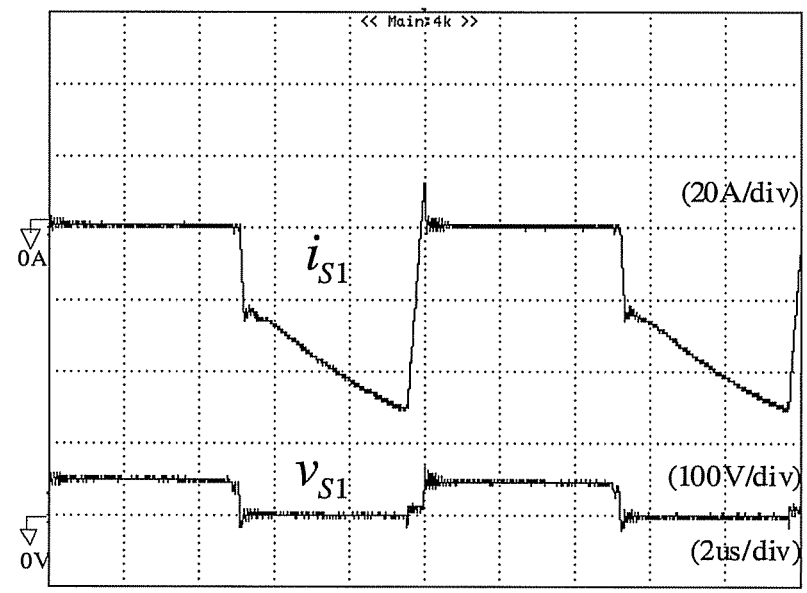
FIG. 20 is a plot illustrating experimental measurement results of the current ($i_{S1}$) flowing through the first switch, and the voltage ($v_{S1}$) across the first switch when the preferred embodiment is operated for step-down conversion.

As shown in FIG. 20, the first switch (S1) is operated under synchronous rectification, and the voltage ($v_{S1}$) across the first switch (S1) is clamped to about 50V.

Figure 21:
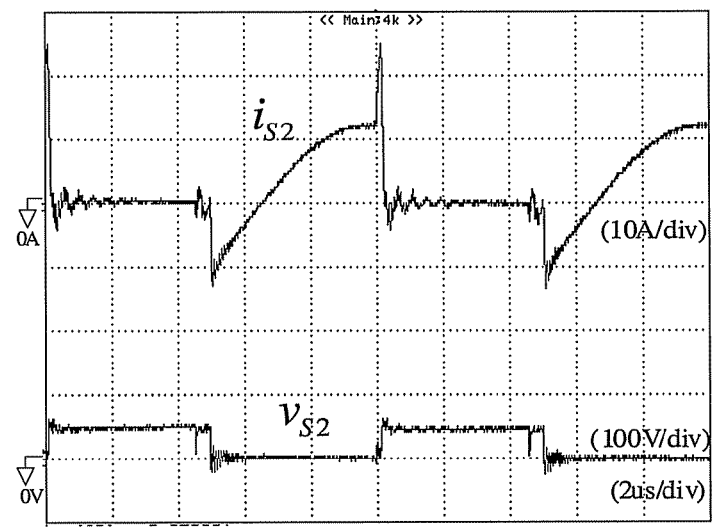
FIG. 21 is a plot illustrating experimental measurement results of the current ($i_{S2}$) flowing through the second switch, and the voltage ($v_{S2}$) across the second switch when the preferred embodiment is operated for step-down conversion.

As shown in FIG. 21, the second switch (S2) has synchronous rectification and zero-voltage switching characteristics, and the second switch (S2) has the same clamp voltage as that of the first switch (S1).

Figure 22:
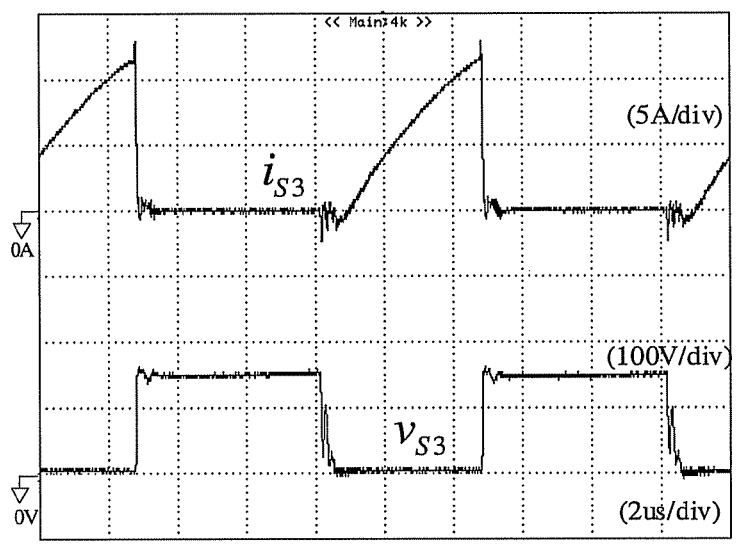
FIG. 22 is a plot illustrating experimental measurement results of the current ($i_{S3}$) flowing through the third switch, and the voltage ($v_{S3}$) across the third switch when the preferred embodiment is operated for step-down conversion.
Figure 23:
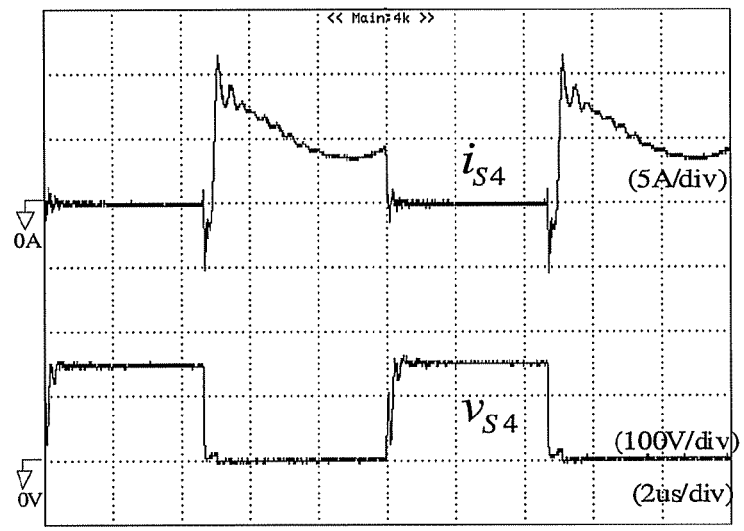
FIG. 23 is a plot illustrating experimental measurement results of the current ($i_{S4}$) flowing through the fourth switch, and the voltage ($v_{S4}$) across the fourth switch when the preferred embodiment is operated for step-down conversion.

As shown in FIGS. 22 and 23, the third and fourth switches (S3, S4) have zero-voltage switching characteristics when switching from the OFF-state to the ON-state, and the voltages ($v_{S3}$, $v_{S4}$) across the third and fourth switches (S3, S4) are clamped to about 150V.

FIGS. 24 to 28 illustrate experimental measurement results when the bidirectional power converting device of the preferred embodiment is operated during step-up conversion under the voltage ($V_H$) of 200V, the voltage ($V_L$) of 24V and an output power of 500 W.

Figure 24:
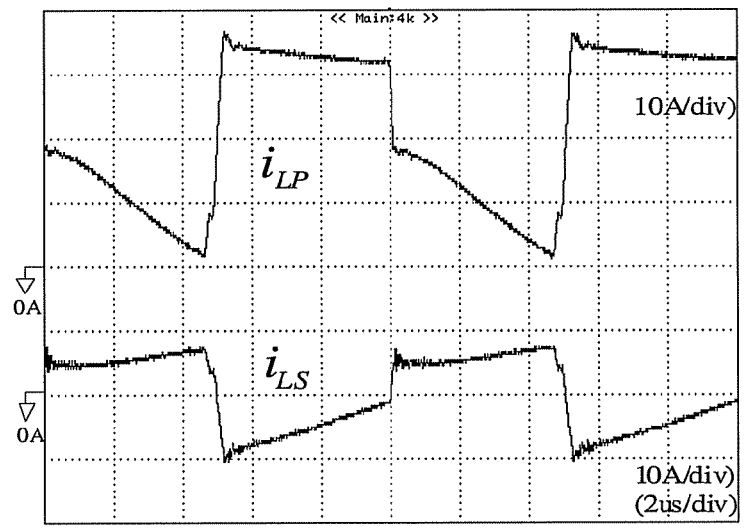
FIG. 24 is a plot illustrating experimental measurement results of the currents ($i_{LP}$, $i_{LS}$) flowing respectively through the first and second windings when the preferred embodiment is operated for step-up conversion.

As shown in FIG. 24, the whole current ($i_{LP}$) flowing through the first winding (LP) is a positive discharging current from the rechargeable battery set (BL), and the current ($i_{LS}$) flowing through the first winding (LS) is bidirectional.

Figure 25:
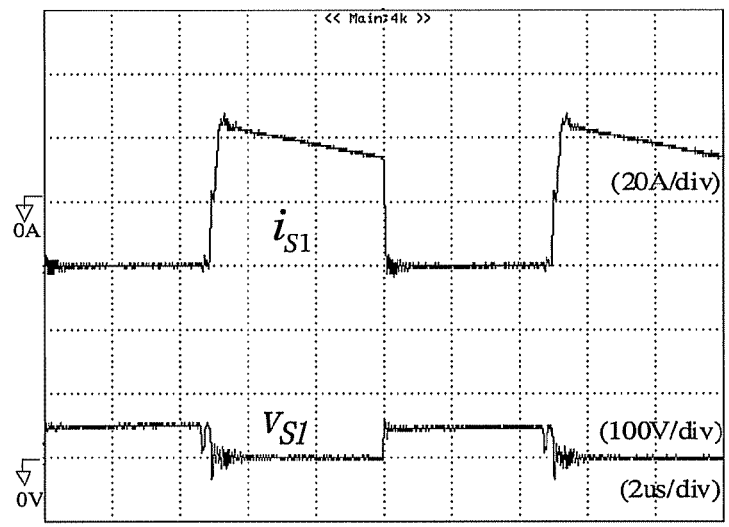
FIG. 25 is a plot illustrating experimental measurement results of the current ($i_{S1}$) flowing through the first switch, and the voltage ($v_{S1}$) across the first switch when the preferred embodiment is under the step-up conversion.

As shown in FIG. 25, the waveform of the current ($i_{S1}$) flowing through the first switch (S1) closely resembles a square shape. Thus, the first switch (S1) has lower conduction loss and zero-current switching characteristics, and the first switch (S1) has a clamp voltage equal to about 50V.

Figure 26:
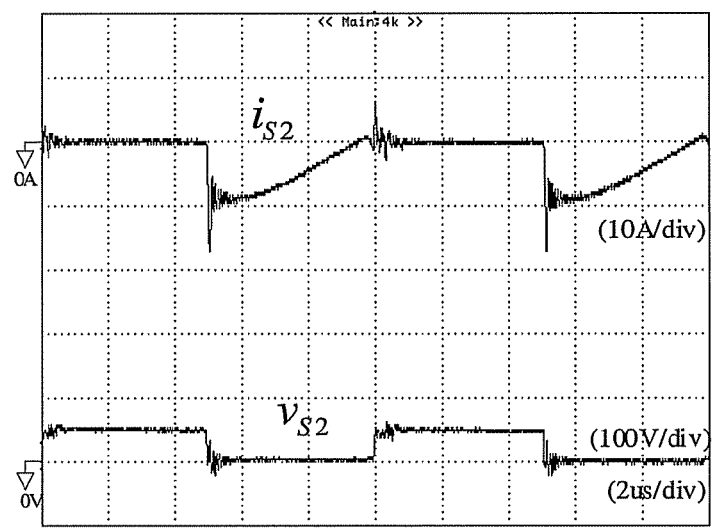
FIG. 26 is a plot illustrating experimental measurement results of the current ($i_{S2}$) flowing through the second switch, and the voltage ($v_{S2}$) across the second switch when the preferred embodiment is operated for step-up conversion.

As shown in FIG. 26, the second switch (S2) has synchronous rectification and zero-voltage switching characteristics, and the second switch (S2) has the same clamp voltage as that of the first switch (S1).

Figure 27:
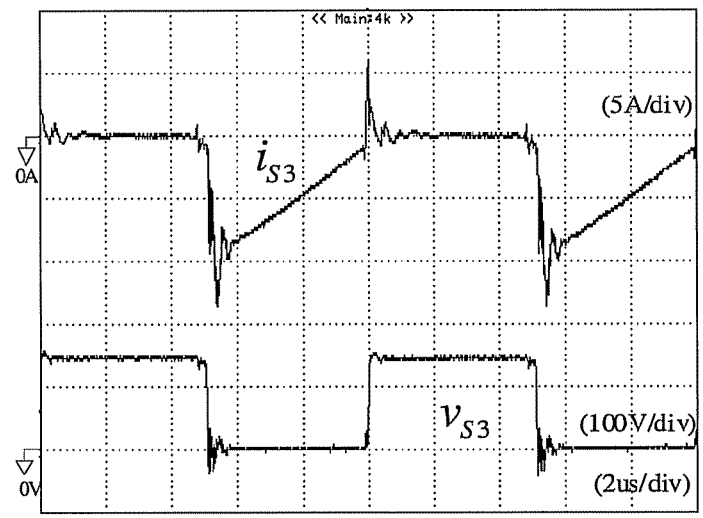
FIG. 27 is a plot illustrating experimental measurement results of the current ($i_{S3}$) flowing through the third switch, and the voltage ($v_{S3}$) across the third switch when the preferred embodiment is operated for step-up conversion.
Figure 28:
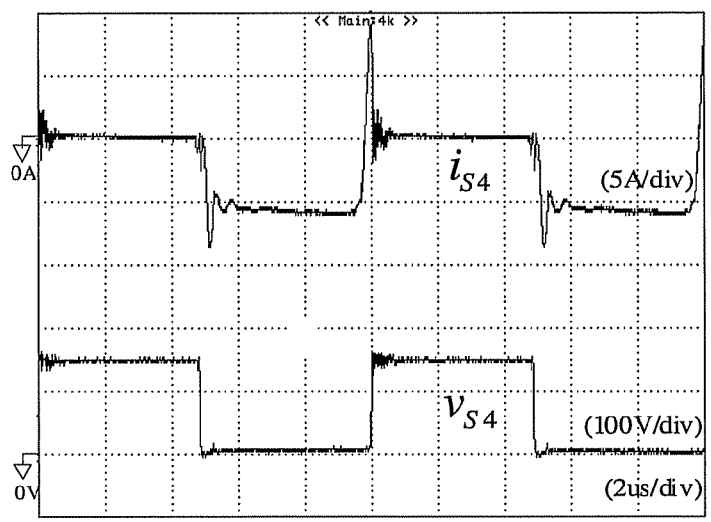
FIG. 28 is a plot illustrating experimental measurement results of the current ($i_{S4}$) flowing through the fourth switch, and the voltage ($v_{S4}$) across the fourth switch when the preferred embodiment is operated for step-up conversion.

As shown in FIGS. 27 and 28, the third and fourth switches (S3, S4) have synchronous rectification and zero-voltage switching characteristics, and the voltages ($v_{S3}$, $v_{S4}$) across the third and fourth switches (S3, S4) are clamped to about 150V.

Figure 29:
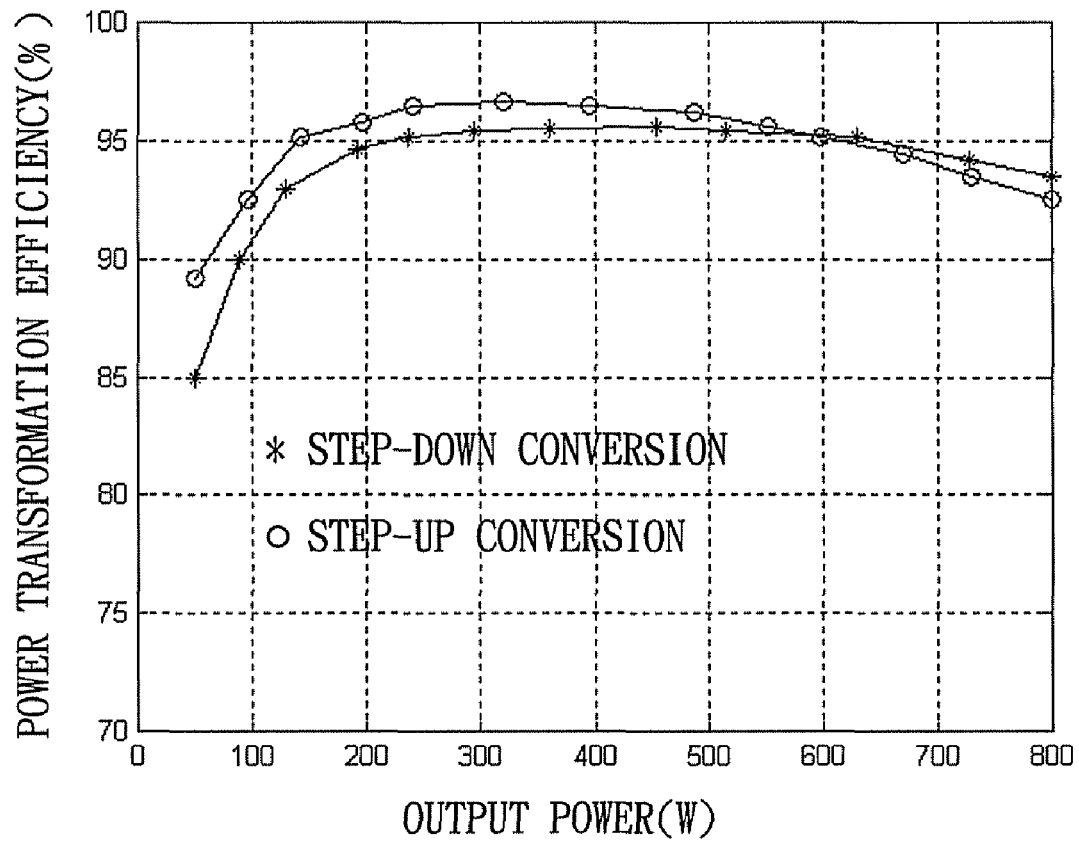
FIG. 29 is a plot illustrating experimental results of power transformation efficiency of the preferred embodiment during step-down and step-up conversions.

FIG. 29 illustrates experimental results of power transformation efficiency of the power converting device of the preferred embodiment during step-down and step-up conversions. As shown in FIG. 29, the power converting device has a maximum power transformation efficiency of about 95% when operated during step-down conversion, and a maximum power transformation efficiency of about 96% during step-up conversion.

The following are some of the advantages attributed to the bidirectional power converting device of the present invention:

1. The bidirectional power converting device does not require an inductor and diodes as compared to the aforesaid conventional bidirectional power converting device. Therefore, the bidirectional power converting device of the present invention has a relatively small volume and incurs relatively low costs.

2. When the bidirectional power converting device performs step-down and step-up conversions, each of the first, second, third and fourth switches (S1, S2, S3, S4) has zero-voltage switching and zero-voltage switching characteristics, and a fixed clamp voltage smaller than the voltage ($V_H$).

3. Due to synchronous rectification, conduction losses of the first, second, third and fourth switches (S1, S2, S3, S4) are effectively reduced. Furthermore, the bidirectional power converting device of the present invention has relatively high step-down and step-up gain ratios ($G_{V1}$, $G_{V2}$), and a relatively high power transformation efficiency.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bidirectional power converting device adapted to be coupled between first and second power storage units, said bidirectional power converting device comprising:
    a coupling circuit including first and second windings each having first and second ends, said first end of said first winding being adapted to be coupled to the first power storage unit, said first end of said second winding being coupled to said second end of said first winding;
    a first switch having a first end coupled to said second end of said first winding, and a grounded second end, said first switch being operable between an ON-state and an OFF-state;
    a second switch having a first end coupled to said second end of said first winding, and a second end, said second switch being operable between an ON-state and an OFF-state;
    a third switch having a first end coupled to said second end of said second switch, and a second end coupled to said second end of said second winding, said third switch being operable between an ON-state and an OFF-state;
    a fourth switch having a first end coupled to said second end of said third switch, and a second end adapted to be coupled to the second power storage unit, said fourth switch being operable between an ON-state and an OFF-state; and
    a first capacitor coupled between said second end of said second switch and ground;
    wherein said first, second, third and fourth switches are operable so that an input voltage supplied by one of the first and second power storage units is converted into an output voltage that is adapted to be supplied to the other one of the first and second power storage units.

2. The bidirectional power converting device as claimed in claim 1, wherein, when the input voltage is supplied by the second power storage unit for conversion into the output voltage that is to be supplied to the first power storage unit, charging and discharging of said first capacitor are conducted through said second switch that is in the ON-state.

3. The bidirectional power converting device as claimed in claim 1, further comprising a second capacitor coupled between said second end of said second winding and said second end of said third switch.

4. The bidirectional power converting device as claimed in claim 3, wherein, when the input voltage is supplied by the second power storage unit for conversion into the output voltage that is to be supplied to the first power storage unit, charging of said second capacitor is conducted through said fourth switch that is in the ON-state.

5. The bidirectional power converting device as claimed in claim 1, wherein, when the input voltage is supplied by the second power storage unit for conversion into the output voltage that is to be supplied to the first power storage unit, said first and third switches have the same duty cycle.

6. The bidirectional power converting device as claimed in claim 1, wherein, when the input voltage is supplied by the second power storage unit for conversion into the output voltage that is to be supplied to the first power storage unit,
    said first and third switches are simultaneously in the ON-state,
    duration of the ON-state of one of said first and fourth switches does not overlap duration of the ON-state of the other one of said first and fourth switches, and
    said second switch is in the ON-state within duration of the ON-state of said fourth switch.

7. The bidirectional power converting device as claimed in claim 1, wherein, when the input voltage is supplied by the first power storage unit for conversion into the output voltage that is to be supplied to the second power storage unit, said second and fourth switches have the same duty cycle.

8. The bidirectional power converting device as claimed in claim 1, wherein, when the input voltage is supplied by the first power storage unit for conversion into the output voltage that is to be supplied to the second power storage unit,
    said second and fourth switches are simultaneously in the ON-state,
    duration of the ON-state of one of said first and second switches does not overlap duration of the ON-state of the other one of said first and second switches, and said third switch is in the ON-state within duration of the ON-state of said first switch.

9. The bidirectional power converting device as claimed in claim 1, wherein said first and second ends of said first winding of said coupling circuit are polarity and non-polarity ends, respectively, said first and second ends of said second winding of said coupling circuit being polarity and non-polarity ends, respectively.

* * * * *